United States Patent
Golan et al.

(10) Patent No.: US 11,810,158 B2
(45) Date of Patent: Nov. 7, 2023

(54) WEIGHTED PSEUDO—RANDOM DIGITAL CONTENT SELECTION

(71) Applicant: Oath Inc., New York, NY (US)

(72) Inventors: Shahar Golan, Haifa (IL); Oren Shlomo Somekh, Bet-Yehoshua (IL); Michal Aharon, Haifa (IL)

(73) Assignee: YAHOO AD TECH LLC, New York, NY (US)

( * ) Notice: Subject to any disclaimer, the term of this patent is extended or adjusted under 35 U.S.C. 154(b) by 1185 days.

(21) Appl. No.: 14/979,085

(22) Filed: Dec. 22, 2015

(65) Prior Publication Data

US 2017/0177337 A1     Jun. 22, 2017

(51) Int. Cl.
*G06Q 30/02*     (2023.01)
*G06F 16/248*     (2019.01)
*G06F 16/22*     (2019.01)
*G06F 16/2455*     (2019.01)
*G06Q 30/0241*     (2023.01)

(52) U.S. Cl.
CPC ..... *G06Q 30/0277* (2013.01); *G06F 16/2237* (2019.01); *G06F 16/248* (2019.01); *G06F 16/2455* (2019.01)

(58) Field of Classification Search
CPC ............ G06Q 30/0277; G06Q 30/0251; G06F 16/2237; G06F 16/2455; G06F 16/248
USPC .................................................... 705/14.54
See application file for complete search history.

(56) References Cited

U.S. PATENT DOCUMENTS

| | | | | |
|---|---|---|---|---|
| 7,406,434 B1 * | 7/2008 | Chang | ................ | G06Q 30/0204 705/14.1 |
| 7,921,036 B1 * | 4/2011 | Sharma | .............. | G06Q 20/3674 705/52 |
| 2003/0130887 A1 * | 7/2003 | Nathaniel | .......... | G06Q 30/0277 705/14.73 |
| 2010/0106605 A1 * | 4/2010 | Lin | ..................... | G06Q 30/0277 705/14.73 |
| 2010/0257022 A1 * | 10/2010 | Wang | ..................... | G06Q 30/02 705/7.29 |
| 2011/0246307 A1 * | 10/2011 | Zinkevich | .............. | G06Q 30/02 705/14.61 |
| 2012/0166445 A1 * | 6/2012 | Chakrabarti | ...... | G06F 16/24578 707/742 |
| 2017/0177337 A1 * | 6/2017 | Golan | ................ | G06Q 30/0277 |
| 2018/0032636 A1 * | 2/2018 | Mullaney | .............. | G06F 40/295 |

FOREIGN PATENT DOCUMENTS

WO     WO-2006071246 A1 *  7/2006  ............. A63F 13/61

OTHER PUBLICATIONS

Morgane Barbet Massin, Selecting pseudo-absences for species distribution models: how, where and howmany?, 2012 (Year: 2012).*
Weisstein, Eric, "Sphere Point Picking", Wolfram MathWorld, retrieved Mar. 3, 2016 from http://mathworld.wolfram.com/SpherePointPicking.html.

* cited by examiner

*Primary Examiner* — Tarek Elchanti
(74) *Attorney, Agent, or Firm* — Cooper Legal Group LLC

(57) ABSTRACT

Briefly, embodiments disclosed herein may relate to digital content selection, and more particularly to weighted pseudo-random digital content selection for use in and/or with online digital content delivery, such as online advertising, for example.

20 Claims, 5 Drawing Sheets

WEIGHTED PSEUDO—RANDOM DIGITAL CONTENT SELECTION

BACKGROUND

Field

Subject matter disclosed herein relates generally to digital content selection, and more particularly to weighted pseudo-random digital content selection for use in and/or with online digital content delivery, such as online advertising, for example.

Content

The Internet is widespread. The World Wide Web or simply the Web, provided by the Internet, is growing rapidly, at least in part, from the large amount of content being added seemingly on a daily basis. A wide variety of content in the form of stored signals, such as, web pages, text documents, images, audio files, and/or video files, for example, is continually being processed, such as, identified, located, retrieved, accumulated, stored, and/or communicated, for example. With so much on-line content being available, a number of tools and/or services may be provided to users so as to allow for copious amounts of content to be searched in a more efficient and/or more effective manner. For example, service providers may allow users to search the Web and/or other like networks using various systems, such as content management systems, including search engines, for example. Search engines may, for example, help a user to search the Web from a search query so as to try to locate and/or retrieve content of interest.

At times, in addition to locating and/or retrieving content, search engines may facilitate and/or support delivery of digital content, such as online advertisements, for example, by trying to anticipate digital content that users may be interested in. At times, a targeted delivery of digital content, such as tailored online advertisements, for example, may improve user engagement, increase click-through and/or conversion rates, boost revenue, or the like.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
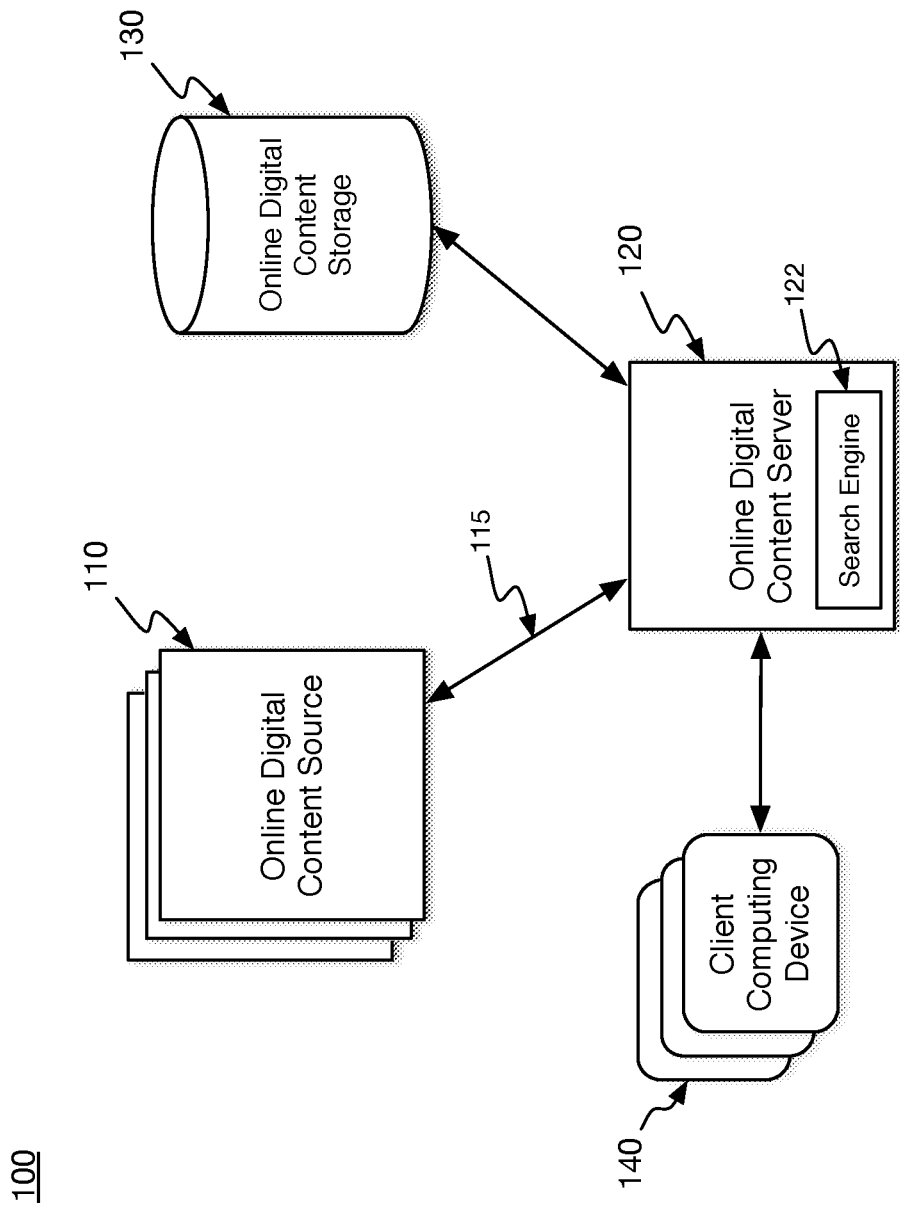
FIG. 1 is a schematic diagram illustrating an example search engine environment, in accordance with an embodiment.

Reference is made in the following detailed description to accompanying drawings, which form a part hereof, wherein like numerals may designate like parts throughout to indicate corresponding and/or analogous components. It will be appreciated that components illustrated in the figures have not necessarily been drawn to scale, such as for simplicity and/or clarity of illustration. For example, dimensions of some components may be exaggerated relative to other components. Further, it is to be understood that other embodiments may be utilized. Furthermore, structural and/or other changes may be made without departing from claimed subject matter. It should also be noted that directions and/or references, for example, such as up, down, top, bottom, and so on, may be used to facilitate discussion of drawings and/or are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope, for example. In general, of course, these and other issues vary with context. Therefore, particular context of description and/or usage provides helpful guidance regarding inferences to be drawn.

With advances in technology, it has become more typical to employ distributed computing approaches in which portions of a problem, such as signal processing of signal samples, for example, may be allocated among computing devices, including one or more clients and/or one or more servers, via a computing and/or communications network, for example. A network may comprise two or more network devices and/or may couple network devices so that signal communications, such as in the form of signal packets and/or frames (e.g., comprising one or more signal samples), for example, may be exchanged, such as between a server and a client device and/or other types of devices, including between wireless devices coupled via a wireless network, for example.

An example of a distributed computing system comprises the Hadoop distributed computing system, which employs a map-reduce type of architecture. In this context, the terms map-reduce architecture and/or similar terms are intended to refer a distributed computing system implementation for processing and/or for generating large sets of signal samples employing a parallel, distributed process performed over a network of individual computing devices. A map operation and/or similar terms refer to processing of signals to generate one or more key-value pairs and to distribute the one or more pairs to the computing devices of the network. A reduce operation and/or similar terms refer to processing of signals via a summary operation (e.g., such as counting the number of students in a queue, yielding name frequencies).

A system may employ such an architecture for processing by marshaling distributed servers, running various tasks in parallel, and managing communications and signal transfers between various parts of the system, in an embodiment. As mentioned, one non-limiting, but well-known example comprises the Hadoop distributed computing system. It refers to an open source implementation of a map-reduce type architecture, but may include other aspects, such as the Hadoop distributed file system (HDFS). In general, therefore, Hadoop and/or similar terms refer to an implementation scheduler for executing large processing jobs using a map-reduce architecture.

In this context, the term "network device" refers to any device capable of communicating via and/or as part of a network and may comprise, for example, a computing device. While network devices may be capable of sending and/or receiving signals (e.g., signal packets and/or frames), such as via a wired and/or wireless network, they may also be capable of performing arithmetic and/or logic operations, processing and/or storing signals (e.g., signal samples), such as in memory as physical memory states, and/or may, for example, operate as a server in various embodiments. Network devices capable of operating as a server, or otherwise, may include, as examples, dedicated rack-mounted servers, desktop computers, laptop computers, set top boxes, tablets, netbooks, smart phones, wearable devices, integrated devices combining two or more features of the foregoing devices, the like or any combination thereof. As mentioned, signal packets and/or frames, for example, may be exchanged, such as between a server and a client device and/or other types of network devices, including between wireless devices coupled via a wireless network, for example. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description, a network device (also referred to as a networking device) may be embodied and/or described in terms of a computing device. However, it should further be understood that this description should in no way be construed that claimed subject matter is limited to one embodiment, such as a computing device and/or a network device, and, instead, may be embodied as a variety of devices or combinations thereof, including, for example, one or more illustrative examples.

Likewise, in this context, the terms "coupled", "connected," and/or similar terms are used generically. It should be understood that these terms are not intended as synonyms. Rather, "connected" is used generically to indicate that two or more components, for example, are in direct physical, including electrical, contact; while, "coupled" is used generically to mean that two or more components are potentially in direct physical, including electrical, contact; however, "coupled" is also used generically to also mean that two or more components are not necessarily in direct contact, but nonetheless are able to co-operate and/or interact. The term coupled is also understood generically to mean indirectly connected, for example, in an appropriate context.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more illustrative examples; however, again, particular context of description and/or usage provides helpful guidance regarding inferences to be drawn.

A network may also include now known, and/or to be later developed arrangements, derivatives, and/or improvements, including, for example, past, present and/or future mass storage, such as network attached storage (NAS), a storage area network (SAN), and/or other forms of computing and/or device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be substantially compliant and/or substantially compatible with differing protocols, such as computing and/or communication protocols (e.g., network protocols), may interoperate within a larger network. In this context, the term sub-network and/or similar terms, if used, for example, with respect to a network, refers to the network and/or a part thereof. Sub-networks may also comprise links, such as physical links, connecting and/or coupling nodes, such as to be capable to transmit signal packets and/or frames between devices of particular nodes, including wired links, wireless links, or combinations thereof. Various types of devices, such as network devices and/or computing devices, may be made available so that device interoperability is enabled and/or, in at least some instances, may be transparent to the devices. In this context, the term transparent refers to devices, such as network devices and/or computing devices, communicating via a network in which the devices are able to communicate via intermediate devices of a node, but without the communicating devices necessarily specifying one or more intermediate devices of one or more nodes and/or may include communicating as if intermediate devices of intermediate nodes are not necessarily involved in communication transmissions. For example, a router may provide a link and/or connection between otherwise separate and/or independent LANs. In this context, a private network refers to a particular, limited set of network devices able to communicate with other network devices in the particular, limited set, such as via signal packet and/or frame transmissions, for example, without a need for re-routing and/or redirecting transmissions. A private network may comprise a stand-alone network; however, a private network may also comprise a subset of a larger network, such as, for example, without limitation, all or a portion of the Internet. Thus, for example, a private network "in the cloud" may refer to a private network that comprises a subset of the Internet, for example. Although signal packet and/or frame transmissions may employ intermediate devices of intermediate nodes to exchange signal packet and/or frame transmissions, those intermediate devices may not necessarily be included in the private network by not being a source or destination for one or more signal packet and/or frame transmissions, for example. It is understood in this context that a private network may provide outgoing network communications to devices not in the private network, but devices outside the private network may not necessarily be able to direct inbound network communications to devices included in the private network.

The Internet refers to a decentralized global network of interoperable networks that comply with the Internet Protocol (IP). It is noted that there are several versions of the Internet Protocol. Here, the term Internet Protocol, IP, and/or similar terms, is intended to refer to any version, now known and/or later developed of the Internet Protocol. The Internet includes local area networks (LANs), wide area networks (WANs), wireless networks, and/or long haul public networks that, for example, may allow signal packets and/or frames to be communicated between LANs. The term World Wide Web (WWW or Web) and/or similar terms may also be used, although it refers to a part of the Internet that complies with the Hypertext Transfer Protocol (HTTP). For example, network devices may engage in an HTTP session through an exchange of appropriately substantially compatible and/or substantially compliant signal packets and/or frames. It is noted that there are several versions of the Hypertext Transfer Protocol. Here, the term Hypertext Transfer Protocol, HTTP, and/or similar terms is intended to refer to any version, now known and/or later developed. It is likewise noted that in various places in this document substitution of the term Internet with the term World Wide Web ('Web') may be made without a significant departure in meaning and may, therefore, not be inappropriate in that the statement would remain correct with such a substitution.

Although claimed subject matter is not in particular limited in scope to the Internet and/or to the Web; nonetheless, the Internet and/or the Web may without limitation provide a useful example of an embodiment at least for purposes of illustration. As indicated, the Internet and/or the Web may comprise a worldwide system of interoperable networks, including interoperable devices within those networks. The Internet and/or Web has evolved to a public, self-sustaining facility that may be accessible to tens of millions of people or more worldwide. Also, in an embodiment, and as mentioned above, the terms "WWW" and/or "Web" refer to a part of the Internet that complies with the Hypertext Transfer Protocol. The Internet and/or the Web, therefore, in this context, may comprise an service that organizes stored content, such as, for example, text, images, video, etc., through the use of hypermedia, for example. A HyperText Markup Language ("HTML"), for example, may be utilized to specify content and/or to specify a format for hypermedia type content, such as in the form of a file and/or an "electronic document," such as a Web page, for example. An Extensible Markup Language ("XML") may also be utilized to specify content and/or format of hypermedia type content, such as in the form of a file or an "electronic document," such as a Web page, in an embodiment. Of course, HTML and/or XML are merely example languages provided as illustrations. Furthermore, HTML and/or XML (and/or similar terms) is intended to refer to any version, now known and/or later developed of these languages. Likewise, claimed subject matter is not intended to be limited to examples provided as illustrations, of course.

As used herein, the term "Web site" and/or similar terms refer to a collection of related Web pages. Also as used herein, "Web page" and/or similar terms refer to any electronic file and/or electronic document, such as may be accessible via a network, including by specifying a URL for accessibility via the Web, in an example embodiment. As alluded to above, in one or more embodiments, a Web page may comprise content coded using one or more languages, such as, for example, markup languages, including HTML and/or XML, although claimed subject matter is not limited in scope in this respect. Also, in one or more embodiments, application developers may write code in the form of JavaScript, for example, executable by a computing device to provide content to populate one or more templates, such as for an application. The term 'JavaScript' and/or similar terms are intended to refer to any now known and/or later developed version of this programming language. However, JavaScript is merely an example programming language. As was mentioned, claimed subject matter is not intended to be limited to examples and/or illustrations.

As used herein, the terms "entry", "electronic entry", "document", "electronic document", "content", "digital content", "item", and/or similar terms are meant to refer to signals and/or states in a physical format, such as a digital signal and/or digital state format, e.g., that may be perceived by a user if displayed, played and/or otherwise executed by a device, such as a digital device, including, for example, a computing device, but otherwise might not necessarily be perceivable by humans (e.g., in a digital format). Likewise, in this context, content (e.g., digital content) provided to a user in a form so that the user is able to perceive the underlying content itself (e.g., hear audio or see images, as examples) is referred to, with respect to the user, as 'consuming' content, 'consumption' of content, 'consumable' content and/or similar terms. Also, as used herein, the term "digital content object" refers to a portion of digital content. Examples of digital content objects may include, but are not limited to, one or more electronic documents, online advertisements, etc. For one or more embodiments, an electronic document may comprise a Web page coded in a markup language, such as, for example, HTML (hypertext markup language). In another embodiment, an electronic document may comprise a portion or a region of a Web page. However, claimed subject matter is not intended to be limited in these respects. Also, for one or more embodiments, an electronic document and/or electronic entry may comprise a number of components. Components in one or more embodiments may comprise text, for example, in the form of physical signals and/or physical states (e.g., capable of being physically displayed). Also, for one or more embodiments, components may comprise a graphical object, such as, for example, an image, such as a digital image, and/or sub-objects, such as attributes thereof, which, again, comprise physical signals and/or physical states (e.g., capable of being physically displayed). In an embodiment, content may comprise, for example, text, images, audio, video, and/or other types of electronic documents and/or portions thereof, for example.

Also as used herein, one or more parameters may be descriptive of a collection of signal samples, such as one or more electronic documents, and exist in the form of physical signals and/or physical states, such as memory states. For example, one or more parameters, such as referring to an electronic document comprising an image, may include parameters, such as time of day at which an image was captured, latitude and longitude of an image capture device, such as a camera, for example, etc. In another example, one or more parameters relevant to content, such as content comprising a technical article, may include one or more authors, for example. Claimed subject matter is intended to embrace meaningful, descriptive parameters in any format, so long as the one or more parameters comprise physical signals and/or states, which may include, as parameter examples, name of the collection of signals and/or states (e.g., file identifier name), technique of creation of an electronic document, purpose of an electronic document, time and date of creation of an electronic document, logical path of an electronic document (or portion thereof), encoding formats and/or standards used for encoding an electronic document, and so forth.

Signal packets and/or frames, also referred to as signal packet transmissions and/or signal frame transmissions, may be communicated between nodes of a network, where a node may comprise one or more network devices and/or one or more computing devices, for example. As an illustrative example, but without limitation, a node may comprise one or more sites employing a local network address. Likewise, a device, such as a network device and/or a computing device, may be associated with that node. A signal packet and/or frame may, for example, be communicated via a communication channel and/or a communication path, such as comprising a portion of the Internet and/or the Web, from a site via an access node coupled to the Internet. Likewise, a signal packet and/or frame may be forwarded via network nodes to a target site coupled to a local network, for example. A signal packet and/or frame communicated via the Internet and/or the Web, for example, may be routed via a path comprising one or more gateways, servers, etc. that may, for example, route a signal packet and/or frame substantially in accordance with a target and/or destination address and availability of a network path of network nodes to the target and/or destination address. Although the Internet and/or the Web comprise a network of interoperable networks, not all of those interoperable networks are necessarily available and/or accessible to the public.

In particular implementations, a network protocol for communicating between devices may be characterized, at least in part, substantially in accordance with a layered description, such as the so-called Open Systems Interconnection (OSI) seven layer approach and/or description. A network protocol refers to a set of signaling conventions, such as for computing and/or communications transmissions, for example, as may take place between and/or among devices in a network, typically network devices; for example, devices that substantially comply with the protocol and/or that are substantially compatible with the protocol. In this context, the term "between" and/or similar terms are understood to include "among" if appropriate for the particular usage and vice-versa. Likewise, in this context, the terms "compatible with", "comply with" and/or similar terms are understood to include substantial compliance and/or substantial compatibility.

Typically, a network protocol, such as protocols characterized substantially in accordance with the aforementioned OSI description, has several layers. These layers may be referred to here as a network stack. Various types of transmissions, such as network transmissions, may occur across various layers. A lowest level layer in a network stack, such as the so-called physical layer, may characterize how symbols (e.g., bits and/or bytes) are transmitted as one or more signals (and/or signal samples) over a physical medium (e.g., twisted pair copper wire, coaxial cable, fiber optic cable, wireless air interface, combinations thereof, etc.). Progressing to higher-level layers in a network protocol stack, additional operations may be available by initiating network transmissions that are substantially compatible and/or substantially compliant with a particular network protocol at these higher-level layers. For example, higher-level layers of a network protocol may, for example, affect device permissions, user permissions, etc.

A virtual private network (VPN) may enable a remote device to more securely (e.g., more privately) communicate via a local network. A router may allow network communications in the form of network transmissions (e.g., signal packets and/or frames), for example, to occur from a remote device to a VPN server on a local network. A remote device may be authenticated and a VPN server, for example, may create a special route between a local network and the remote device through an intervening router. However, a route may be generated and/or also regenerated if the remote device is power cycled, for example. Also, a VPN typically affects a single remote device.

A network may be very large, such as comprising thousands of nodes, millions of nodes, billions of nodes, or more, as examples. As mentioned, with networks, such as the Internet, gaining popularity, and with a vast multitude of content, such as pages, other electronic documents, other media content and/or applications (hereinafter 'digital content' or 'content'), becoming available to users, such as via the World Wide Web (hereinafter 'Web'), it may be desirable to provide more efficient and/or more streamlined approaches to gather, organize, store, modify, search, and/or retrieve content, such as digital content, for example. Internet-type business entities, such as Yahoo!, for example, may provide a wide range of content storage, search, and/or retrieval services for a wide range of applications, for example. Such content storage, search, and/or retrieval services may involve distributed systems, particularly for large amounts of content to be accessed, stored, modified, and/or searched, for example, by large numbers of clients.

With networks such as the Internet gaining tremendous popularity and with vast multitudes of electronic documents and/or other content becoming available "online" to users, such as via the World Wide Web (Web), for example, online digital content delivery, such as online advertising, for example, has increased in importance and prominence as industry seeks to take better advantage of the opportunities potentially afforded by these networks, including the Internet. As used herein, "online" refers to a type of access that may be implemented via one or more computing and/or communications networks, such as, for example, the Internet, an intranet, a device network, a network for peripherals, a computer network, or the like. In network-related advertising systems, for example, online advertisements, which may be referred to herein as "advertisements," or, more simply, as "ads", may be embedded in electronic documents and/or other digital content, such as Web pages, that may be presented to users via resident browser applications, for example, executed on any of a number of electronic device types, such as, for example, client computing devices. Network-related advertising may be referred to herein as "online advertising," for example. With these or like systems, in some instances, challenges may be faced by advertisers, online digital content server entities, and/or other Internet-type business entities, for example, such as in determining which particular online advertisements to display to particular users and/or types of users, for example.

FIG. 1 is a block diagram of an example embodiment 100 of an online digital content delivery system, such as an online advertisement system, in accordance with an embodiment. In one or more embodiments, an online digital content delivery system, such as online advertisement system 100, for example, may employ one or more computing devices, such as online digital content server computing device 120, that may provide digital content, such as online advertisements, to one or more computing devices, such as one or more client computing devices 140. In an embodiment, an example online advertisement system, such as 100, may include one or more computing devices, such as online digital content source computing devices 110, that may communicate digital content, such as one or more online advertisements, to a computing device, such as online digital content server computing device 120, for example. In an embodiment, one or more computing devices, such as one or more online digital content server computing devices 120, may insert online digital content, such as online advertisements, into online digital content, such as one or more Web pages, to be displayed to one or more users via one or more computing devices, such as one or more client computing devices 140, for example.

In an embodiment, one or more online digital content server computing devices, such as 120, may, for example, employ one or more search engines, such as 122, to select online digital content, such as online advertisements, to be displayed to particular users at least in part in response to queries, such as search queries, identifying and/or otherwise characterizing a particular user and/or a particular type of user to which online digital content, such as a Web page and/or an online advertisement, for example, may be displayed. In an embodiment, at least in part in response to a user interacting with online digital content, such as browsing to a Web page, for example, an online digital content server computing device, such as 120, for example, may initiate a query, such as a search query, to be communicated with a search engine, such as 122. In an embodiment, at least in part in response to a query, such as a search query, a search engine, such as 122, may search one or more databases or like repositories, such as online digital content storage 130, for one or more online advertisements, such as to display to a user that may be identified and/or otherwise characterized, at least in part, by the query. In an embodiment, a search engine, such as 122, employed, for example, in an online digital content delivery system, such as 100, may determine online digital content, such as one or more online advertisements, for example, to be displayed to a particular user based, at least in part, on one or more parameters and/or other digital content included in a query and/or based, at least in part, on one or more parameters and/or other digital content identifying and/or otherwise characterizing digital content, such as one or more online advertisements, stored in one or more databases or like repositories, such as one or more signals and/or states stored in online digital content storage 130. For example, a search engine, such as 122, employed in an online advertisement system, such as 100, may compare one or more parameters and/or other digital content included in a query with one or more parameters and/or other content identifying and/or otherwise characterizing one or more online advertisements and/or may select one or more online advertisements to be displayed to a particular user based, at least in part on the comparison.

In an embodiment, a user may log in to a user's registered account (e.g., Yahoo® Mail, etc.) with an online property, such as 120, for example, to enable a computing device, such as online digital content server computing device 120, to monitor and/or track online user-related activity (e.g., Web browsing activity, interaction with email, etc.). In one or more other embodiments, whether or not a user is logged-in to a registered account, online user-related activity may be monitored and/or tracked, for example, via Web browser application cookies (e.g., files placed in user computing devices file systems) and/or via resident software applications executed on user computing devices, although claimed subject matter is not limited in scope in these respects. In an embodiment, online user-related activity may be monitored and/or tracked as a user interacts with online digital content, such as embedded within and/or associated with one or more Web pages, as one example, provided at least in part by an online digital content delivery system, such as 100. In an embodiment, online user-related activity may be monitored and/or tracked at least in part by monitoring and/or tracking particular online digital content browsed to by a user and/or by monitoring and/or tracking amounts of time spent interacting with and/or viewing particular online digital content, for example. Also, in an embodiment, online user-related activity may be monitored and/or tracked at least in part by monitoring and/or tracking particular online advertisements viewed and/or selected, such as via "clicking" with a mouse and/or other pointing device, by a user. In an embodiment, one or more parameters characterizing online user-related activity, for example, may be stored in a digital content store, such as online digital content storage 130, for example. In an embodiment, a database, such as online digital content storage 130, may comprise a version of Apache HBase, currently available or a version available in the future, for example, from for the Apache Software foundation; however, any database is suitable. Hbase is provided merely as an example; claimed subject matter is not limited in scope in this respect.

Example embodiment 100 is depicted in FIG. 1 as including an online digital content server computing device, such as 120, that provides digital content to users via electronic devices, such as client computing devices 140, and/or that selects online digital content, such as advertisements for display to users. In an embodiment, online digital content server operations and/or online advertisement functions may be performed by one or more computing devices, such as 120, of a single Internet-type business entity. However, claimed subject matter is not limited in scope in these respects. For example, in an embodiment, online digital content server functions, such as may be performed by a Web server computing device, for example, and online advertisement server functions may be performed by two or more separate entities involving multiple computing devices. In an embodiment, for example, an Internet-type business entity may operate one or more computing devices to publish Web pages, for example, and one or more other Internet-type business entities may operation one or more computing devices to select and/or publish online advertisements, for example. However, again, claimed subject matter is not limited in scope in these respects.

In an embodiment, an online digital content delivery system, such as example embodiment 100, may support many users via a plurality of electronic devices, such as client computing devices 140. For example, in an embodiment, tens of millions of users, or more, may be supported by an online advertising system, such as example embodiment 100. In supporting many users, at times, a challenge may, for example, be encountered, such as in determining which online advertisements to display to which users and/or categories of users.

In an embodiment, a search engine, such as 122, employed in an online digital content delivery system, such as 100, for example, may "index" online digital content, such as one or more online advertisements, such as may be available from online digital content source computing device 110, for example. For example, in some instances, online digital content, such as may be available from online digital content source computing device 110, for example, may be indexed approximately as it is added to an online digital content delivery system database or like repository, such as online digital content storage 130, for example. As used herein, the terms "index" and/or "indexing" and/or the like refer to assigning one or more parameters to individual digital content objects, such as one or more online advertisements (e.g., approximately as the individual online advertisements are added to an online advertisement system database), for example to aid in online digital content search query operations. In an embodiment, one or more parameters, such as in the form of an appropriate list and/or any other suitable structure (e.g., a table, etc.) may be assigned to a particular online advertisement based, at least in part, on one or more characteristics of the particular online advertisement that may be determined, for example, by way of an operation that may be referred to as "exploration." As will be seen, one or more parameters may, for example, be represented via one or more vectors comprising one or more online digital content-related and/or user-related feature points. As used herein, the term "exploration" refers to an operation that includes displaying one or more digital content objects, such as one or more online advertisements, to a plurality of users, such as via one or more client computing devices 140, and/or tracking user interaction and/or behavior with respect to these digital content objects to determine one or more characteristics of the displayed digital content objects, such as in relation to individual users of the plurality of users. For example, by displaying a particular online advertisement to a plurality of users and/or by tracking user interactions and/or behaviors with respect to such an online advertisement, at times, determinations may be made as to which type and/or category of user to which it may be advantageous to display this particular online advertisement, for example, and/or other similar online advertisements. One or more parameters may, for example, be assigned to an online advertisement at least in part in connection with an indexing operation, including, for example, an exploration operation, to specify one or more characteristics of the online advertisement based at least in part on tracked user interaction and/or behavior, in an embodiment. For example, a particular online advertisement may be determined to be of particular interest to particular users and/or categories of users, and one or more parameters may be assigned to the particular online advertisement to reflect such determined characteristics, in an embodiment, as part of an exploration operation.

In an embodiment, an exploration operation with respect to a particular digital content object, such as a particular online advertisement, for example, may affect at least partially an indexing operation for the particular digital content object, and the indexing operation may in turn affect how often and/or to which users the particular digital content object may be selected, such as for display, for example. Thus, in some instances, one or more exploration operations may partially and/or substantially affect performance and/or operation of an online digital content delivery system, such as 100, for example, and employing a variety of exploration approaches may yield a variety of operational results, such as in an online digital content delivery system, online advertisement delivery system, search engine, etc. For example, as described more fully below, an example exploration operation may include one or more weighted pseudo-random exploration techniques that may be based, at least in part, on specified weighting parameters, wherein a likelihood of an individual digital content object, such as an online advertisement, being selected for display to a user as part of one or more exploration operations may be based, at least in part, on specified weighting parameters, in an embodiment. A likelihood of selection for a digital content object, such as an online advertisement, in one or more embodiments may include, for example, a comparison between one or more parameters assigned to a digital content object and one or more parameters assigned to a query, for example, as described more fully below.

As used herein, the term "impression" refers to a view of online digital content, such as a Web page and/or online advertisement, for example, by a user, such as by the user browsing to a Web page and/or viewing email, for example. In an embodiment, to perform exploration operations for a set of digital content objects, such as a set of online advertisements, such that a plurality of impressions may be approximately and/or substantially uniformly distributed among the set of digital content objects, individual digital content objects may be assigned a list of one or more parameters comprising pseudo-random values. For example, a digital content object, such as an online advertisement, may be assigned a list of parameters V_d of size k+1, wherein a first k parameters of list V_d may be assigned and/or comprise pseudo-random values between 0 and 1, and wherein a final parameter of list V_d may be assigned and/or comprise a value of 1. In an embodiment, parameter lists, such as V_d, may, for example, be represented via one or more vectors comprising one or more feature points related to particular digital content. In an embodiment, vectors may comprise a set of numbers, such as represented via signals and/or states. Vector-type representations are generally known and need not be described here in greater detail. Additionally, in an embodiment, to perform exploration operations for a set of digital content objects such that a plurality of impressions may be approximately and/or substantially uniformly distributed among the set of digital content objects, individual queries may be assigned a list of parameters comprising one or more pseudo-random values. For example, a query may be assigned a list of parameters V_q, wherein a first k parameters of list V_q may comprise pseudo-random binary values (e.g., either 0 or 1, with a probability of approximately 0.5 that a parameter will comprise a value of 0 and with a probability of approximately 0.5 that a parameter will comprise a value of 1). Also, in an embodiment, a final parameter of list V_q may comprise a pseudo-random value between 0 and 1.

Further, in an embodiment, to perform exploration operations for a set of digital content objects, such as a set of online advertisements, for example, such that a plurality of impressions are approximately and/or substantially uniformly distributed among the set of digital content objects, an inner product between a parameter list assigned to a digital content object, such as list V_d, and another parameter list assigned to a query, such as list V_q, may be denoted by <V_d, V_q>, and may be represented by the following example relation:

$$<V\_d, V\_q> = \Sigma_{i=1 \text{ to } k+1} V\_\{q,i\} * V\_\{d,i\} \tag{1}$$

Additionally, in an embodiment, a product s(V_q, V_d) may be characterized as, for example:

$$s(V\_d, V\_q) = <V\_d, V\_q> \bmod 1 \tag{2}$$

In an embodiment, s(V_q, V_d) may comprise a score parameter value to be calculated, for example, for individual digital content objects of a set of digital content objects at least in part in response to a query to be generated at least in part in response to online user-related activity, such as a user browsing to a Web site and/or viewing email, for example, as part of exploration operations for the set of digital content objects. In an embodiment, a digital content object determined to have been assigned a highest score parameter value, for example, for a particular query may be selected, such as to be displayed to a user, as part of an exploration operation. In an embodiment, example relation (2) may provide score parameter values substantially uniformly distributed between 0 and 1 for individual digital content objects of a set of digital content objects. Thus, in an embodiment, by applying example relation (2) to a set of digital content objects, such as a set of online advertisements, for example, over a plurality of impressions, the impressions may be substantially uniformly distributed among a set of digital content objects during exploration operations. That is, in an embodiment, individual digital content objects of a set of digital content objects may have similar likelihoods of being selected, such as for display to a user, during exploration operations, for example.

As mentioned, exploration operations may be performed for online digital content in an effort to determine how to better tailor, rank, and/or re-rank online digital content, for example, with respect to various types of users and/or groups of users. For the example embodiment described above in connection with example relation (2), online digital content may be assigned score parameters such that a plurality of impressions may be substantially uniformly distributed among a set of digital content objects during exploration operations. Other embodiments may employ a variety of weighting parameters, for example, to affect a variety of impression distributions during exploration operations, as explained more fully below. For example, in an embodiment, exploration operations for a set of digital content objects, such as a set of online advertisements, may be performed such that a plurality of impressions may be approximately and/or substantially distributed among the set of digital content objects in at least substantial proportion to weight values that may be assigned to individual digital content objects of the set of digital content objects. Such exploration operations may be referred to, for example, as weighted pseudo-random exploration operations. As utilized herein, the term "weighted pseudo-random exploration" refers to an exploration operation wherein one or more particular digital content objects, such as particular online advertisements, for example, is assigned a weight value, and wherein a likelihood of a particular digital content object being selected, such as for display to a user, is substantially proportional to the weight value with respect to a sum of weight values for a set of digital content objects, as explained more fully below. In an embodiment, for an example weighted pseudo-random exploration operation, a particular digital content object, such as a particular online advertisement, for example, may be assigned a score parameter value according to an example relation:

$$(\log s(V\_q, V\_d))/w_D \qquad (3)$$

wherein $s(V\_d, V\_q) = \langle V\_d, V\_q \rangle \bmod 1$, as above, wherein $w_D$ denotes a weight value that may be assigned a particular digital content object. Also, as described above, V_d may comprise a list of parameters assigned to a particular digital content object. For example, a digital content object, such as an online advertisement, may be assigned a list of parameters V_d of size k+1, wherein a first k parameters of list V_d may be assigned and/or comprise pseudo-random values between 0 and 1, and wherein a final parameter of list V_d may be assigned and/or comprise a value of 1. Further, as mentioned above, V_q may comprise a list of parameters assigned to a particular query. For example, a query may be assigned a list of parameters V_q, wherein a first k parameters of list V_q may comprise pseudo-random binary values (e.g., either 0 or 1, with a probability of approximately 0.5 that a parameter will comprise a value of 0 and with a probability of approximately 0.5 that a parameter will comprise a value of 1). Also, in an embodiment, a final parameter of list V_q may comprise a pseudo-random value between 0 and 1. At times, it may be advantageous to increase or decrease a likelihood of selection during an exploration operation for a particular digital content object. An appropriate weight value may be assigned to a particular digital content object to achieve a desired likelihood of selection, in an embodiment. For example, in an embodiment, a likelihood of a particular digital content object, such as a particular online advertisement, of a set of digital content objects being selected, such as for display to a user during one or more exploration operations, may be substantially proportional to a relation:

$$w_D / \Sigma_{i \in S} w_i \qquad (4)$$

wherein S denotes a set of digital content objects, $w_D$ denotes a weight value for a particular digital content object of the set of digital content objects, and $w_i$ denotes a weight value for an $i^{th}$ digital content object of the set of digital content objects. In an embodiment, score parameter values assigned to digital content objects, such as online advertisements, such as according to example relation (3), may be analyzed to select one or more advertisements to display to one or more users as part of an example weighted pseudo-random exploration operation, for example. As mentioned, for weighted pseudo-random exploration operations, in an embodiment, a plurality of impressions may be approximately and/or substantially distributed among a set of digital content objects in at least substantial proportion to weight values that may be assigned to individual digital content objects, such as in accordance with expression (4), for example. Also, as mentioned, likelihoods of selection for digital content objects during weighted pseudo-random exploration operations may be increased or decreased, for example, according to assigned weight parameter values. For example, if an advertiser desires to ensure that a particular online advertisement receives an increased portion of impressions during exploration operations, a weight parameter value for the particular online advertisement may be increased in relation to other weight values assigned to other online advertisements. Similarly, if it is desired to decrease a likelihood of selection during exploration operations, a weight parameter value for a particular online advertisement may be decreased in relation to weight parameter values assigned to other online advertisements, for example.

Figure 2:
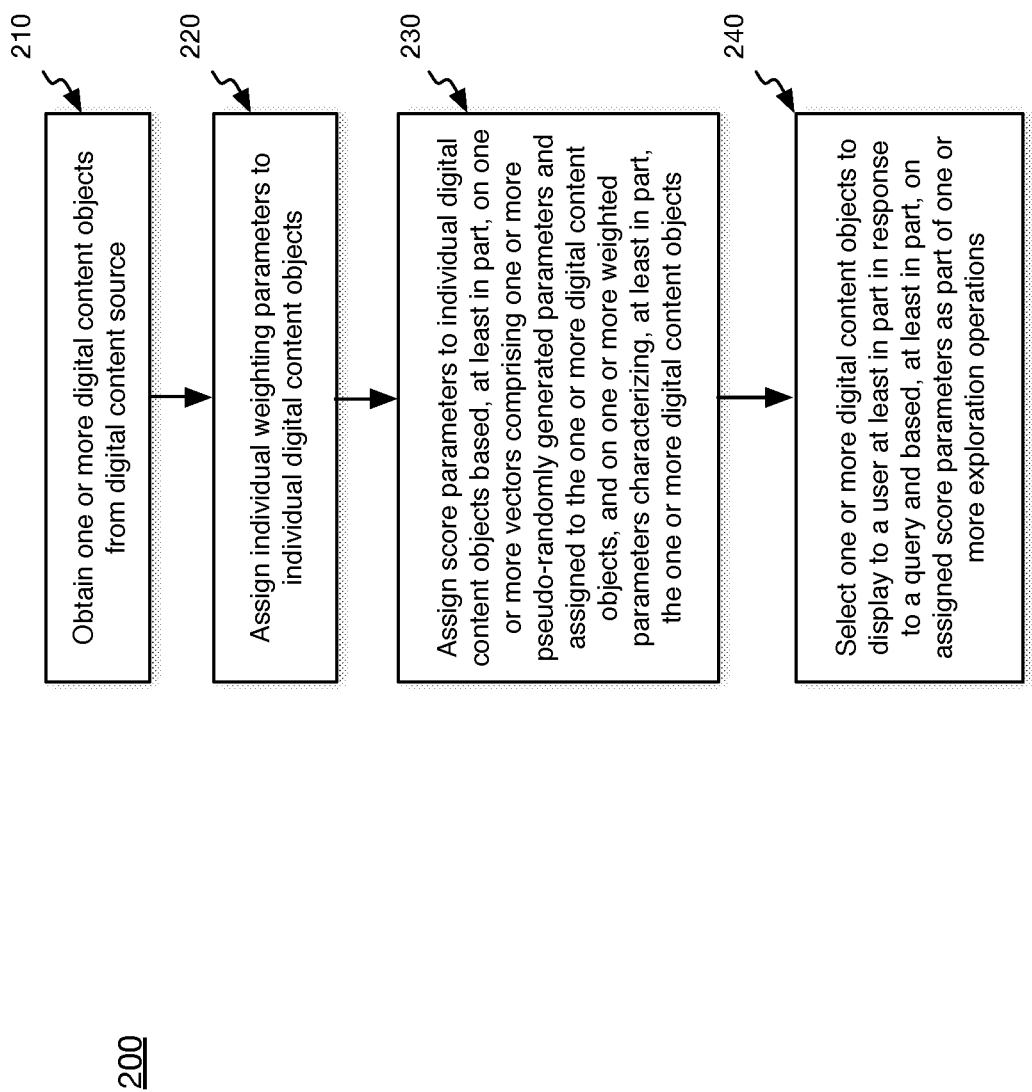
FIG. 2 is a flow diagram illustrating an embodiment of an example process for weighted pseudo-random digital content selection, in accordance with an embodiment.

FIG. 2 is a flow diagram illustrating an embodiment 200 of an example process for an example weighted pseudo-random exploration operation. Claimed subject matter may include all of blocks 210-240, fewer than blocks 210-240, or more than blocks 210-240. Additionally, the order of blocks 210-240 is merely an example order, and claimed subject matter is not limited in scope in these respects. As depicted at block 210, digital content, such as one or more online advertisements, may be obtained from one or more digital content sources, such as one or more online digital content sources 110. Individual weighting parameters may, for example, be assigned to individual digital content objects, such as individual online advertisements, as depicted at block 220. In an embodiment, individual weighting factors to be assigned to digital content objects, such as online advertisements, may, for example, be selected based, at least in part, on a desired likelihood of selection during one or more exploration operations. For example, a higher weighting parameter value may result in a greater likelihood that an individual digital content object will be selected to be displayed to a user during one or more exploration operations, in an embodiment. Conversely, a lower weighting parameter value may result in a lesser likelihood that an individual digital content object will be selected to be displayed to a user during one or more exploration operations, in an embodiment.

As depicted at block 230, a score parameter may be assigned to individual digital content objects. In an embodiment, one or more score parameters may be assigned based, at least in part, on one or more vectors comprising one or more pseudo-randomly generated parameters and assigned to the one or more digital content objects, and on one or more weighted parameters characterizing, at least in part, the one or more digital content objects. In an embodiment, score parameters may provide likelihoods of selection, such as during one or more exploration operations, that may be substantially proportional to weighting parameters for individual digital content objects, such as individual online advertisements. In an embodiment, individual scores for individual content objects, such as individual online advertisements may be calculated, at least in part, according to relation (3) provided above. Additionally, in an embodiment, one or more digital content objects, such as one or more online advertisements, may be selected for display to a user, such as during one or more exploration operations, at least in part in response to a query, and/or one or more digital content objects, such as one or more online advertisements, may be selected based, at least in part, on individually assigned score parameters, such as based at least in part on example relation (3), for example, as depicted at block 240, in an embodiment.

In an embodiment, score parameters for individual digital content objects, such as based at least in part on example relation (3), for example, may be individually pre-assigned prior to one or more exploration operations, for example. In an embodiment, signals and/or states comprising score parameters may be stored in a database and/or like repository, such as online digital content storage 130, for example. In an embodiment, at least in part in response to score parameters for individual digital content objects being assigned, such as stored as signals and/or states in a database and/or like repository, one or more exploration operations may be performed at least in part to facilitate and/or support indexing the content objects, as described above, for example.

In an embodiment, at times, it may be advantageous to perform exploration operations for digital content objects, such as online advertisements, for example, directed at particular users and/or types of users. In an embodiment, for one or more exploration operations, a plurality of impressions may be approximately distributed among the set of digital content objects in at least substantial proportion to a digital content object's similarity to one or more characteristics of a particular user, for example. As utilized herein, the term "personalized weighted pseudo-random exploration" refers to an exploration operation wherein individual content objects, such as individual online advertisements, are assigned a score parameter that is substantially proportional to a content object's similarity to one or more characteristics of a particular user, such as one or more characteristics indicated by one or more parameters of a query, for example. In an embodiment, for an example personalized weighted pseudo-random exploration operation, a list of parameters V_qp may be assigned and/or comprise one or more parameters describing one or more personalized characteristics of a query, such as a search query initiated by a search engine at least in part in response to a user interacting with particular online digital content (e.g., browsing to a particular Web page and/or viewing email). For example, a list of parameters V_qp may be assigned a particular query and may be assigned and/or comprise one or more parameters describing one or more characteristics of a particular user and/or type of user, for example. Further, in an embodiment, a list of parameters V_dp may be assigned and/or comprise one or more parameters describing one or more characteristics of an individual digital content object, such as an individual online advertisement. In an embodiment, a list of parameters related to an individual content object, such as list V_dp, may comprise one or more parameters describing tokens, categories, products, and/or other digital content related to an individual digital content object, such as an individual online advertisement. In an embodiment, for an example personalized weighted pseudo-random exploration operation, a digital content object, such as an online advertisement, may be assigned a score parameter value according to an example relation:

$$(\log s(V\_q, V\_d))/<V\_qp, V\_dp> \qquad (5)$$

wherein <V_qp, V_dp> represents an inner product of parameter list V_qp and parameter list V_dp, such as described above, and wherein s(V_q, V_d) may be characterized according to example relation (2), provided above. As described above, for example, vectors V_q and V_d may be assigned and/or comprise one or more pseudo-randomly generated parameter values. Thus, an element of randomness may be included in calculating a score parameter in accordance with, for example, relation (5). For example, a digital content object, such as an online advertisement, may be assigned a list of parameters V_d of size k+1, wherein a first k parameters of list V_d may be assigned and/or comprise pseudo-random values between 0 and 1, and wherein a final parameter of list V_d may be assigned and/or comprise a value of 1. Further, a query may be assigned a list of parameters V_q, wherein a first k parameters of list V_q may comprise pseudo-random binary values (e.g., either 0 or 1, with a probability of approximately 0.5 that a parameter will comprise a value of 0 and with a probability of approximately 0.5 that a parameter will comprise a value of 1). Also, in an embodiment, a final parameter of list V_q may comprise a pseudo-random value between 0 and 1. In an embodiment, score parameters assigned to individual content objects, such as individual online advertisements, may be analyzed to select one or more digital content objects to be displayed to one or more users as part of an example personalized weighted pseudo-random exploration operation, for example.

As mentioned, at times, it may be advantageous to perform exploration operations for particular online advertisements, for example, directed at particular users and/or types of users. For example, an online advertising entity may desire to explore one or more online advertisements related to automobiles, for example, among users that may be more inclined to be interested in automobiles. For example, it may make sense to direct online advertisements related to automobiles to users who are old enough to drive and/or old enough to be more likely to purchase an automobile. For other online advertisements, it may make sense to direct online advertisements to other types and/or categories of users, for example. Following the automobile example, one or more parameters of vector V_dp, for example, may be assigned and/or may comprise a value indicating that the online advertisement may be more suitable for an older user. Also, for example, a personalized weighted pseudo-random exploration operation may be employed as part of an indexing operation to help ensure that the online advertisements related to automobiles are displayed to users likely to be interested in automobiles based, at least in part, on one or more parameters of vector V_dp and/or on one or more characteristics describing particular users, such as included in lists of parameters V_qp, for example, in addition to randomness that may be introduced, for example, by vectors V_q and V_d according to relation (5), for example. Of course, this is merely one example of how personalized weighted pseudo-random exploration operations may be utilized, and claimed subject matter is not limited in scope in these respects.

Figure 3:
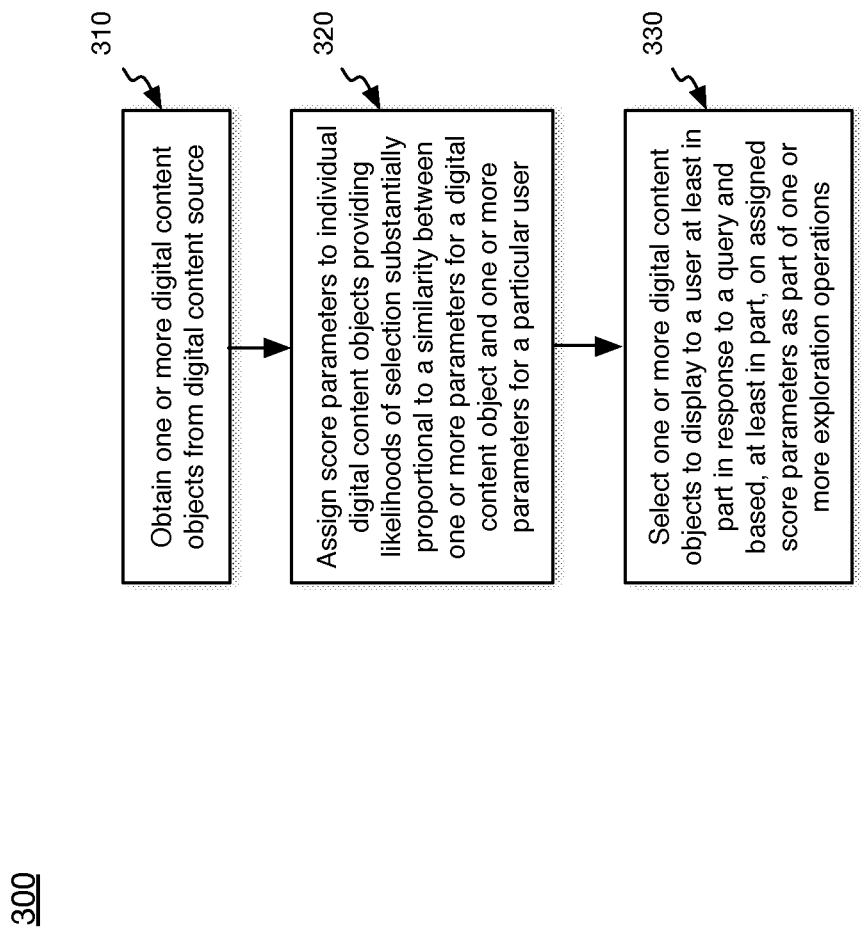
FIG. 3 is a flow diagram illustrating an embodiment of an example process for personalized weighted pseudo-random digital content selection, in accordance with an embodiment.

FIG. 3 is a flow diagram illustrating an embodiment 300 of an example process for an example personalized weighted pseudo-random exploration operation. Claimed subject matter may include all of blocks 310-330, fewer than blocks 310-330, or more than blocks 310-330. Additionally, the order of blocks 310-330 is merely an example order, and claimed subject matter is not limited in scope in these respects. As depicted at block 310, digital content, such as one or more online advertisements, may be obtained from one or more digital content sources, such as one or more online digital content sources 110. As further depicted at block 320, a score parameter may be assigned to individual digital content objects, such as individual online advertisements. In an embodiment, a score parameter for an individual digital content object, such as an individual online advertisement, may provide a likelihood of selection, such as for display to a user as part of one or more exploration operations, that may be substantially proportional to a similarity between one or more parameters for a digital content object, such as an online advertisement, and one or more parameters describing one or more characteristics of a particular user. In an embodiment, a query, such as a search query, may comprise one or more parameters identifying one or more characteristics of a particular user, for example, and such characterizing parameters may be utilized, at least in part, to determine a score parameter for a digital content object.

In an embodiment, individual scores for individual digital content objects, such as individual online advertisements, may be calculated based, at least in part, on expression (5) provided above, for example. Additionally, in an embodiment, one or more digital content objects, such as one or more online advertisements, may be selected to be displayed to a user, such as during one or more exploration operations, at least in part in response to a query, as depicted at block 330. Further, one or more digital content objects, such as one or more online advertisements, may be selected, such as for display to a user during one or more exploration operations, based, at least in part, on individually assigned score parameters as described above, in an embodiment, as further depicted at block 330.

It may be noted that a personalized weighted pseudo-random exploration operation, such as described above in connection with example relation (5) and FIG. 3, for example, may differ from a weighted pseudo-random exploration operation, such as described above in connection with example relation 3 and FIG. 2, for example, in that with a personalized weighted pseudo-random exploration operation, individual digital content objects, such as individual online advertisements, may be weighted based at least in part on one or more parameters characterizing, at least in part, particular users and/or types of users. As such, here, personalized randomization may yield one or more digital content objects, such as online advertisements, for example with higher probabilities for clicking by a particular user based on historical user behavior. This is in contrast to a weighted pseudo-random exploration operation, for example, in that the weighted pseudo-random exploration operation is able to individually weight digital content objects, but is not able to weight for user characteristics. Therefore, for an example weighted pseudo-random exploration operation, likelihoods of selection during one or more exploration operations for individual digital content objects, such as individual online advertisements, may be adjusted generally, but there may be no mechanism for adjusting likelihoods of selection relative to particular users and/or types of users, for example.

At times, it may be advantageous to perform one or more exploration operations for digital content at least in part in accordance with particular groupings or sets of digital content. For example, as utilized herein, the term "digital content-set weighted pseudo-random exploration" refers to an exploration operation wherein weighting parameters for individual content objects, such as individual online advertisements, are derived, at least in part, from a digital content set to which the content object belongs. For example, digital content sets, such as sets of online advertisements, may originate from a particular entity (e.g., an advertiser), and thus may, for example, be deemed to belong to a particular set of digital content objects originating at the particular entity. Thus, here, a set of digital content objects may, for example, be clustered into a particular group so as to randomly generate a distribution for a plurality of individual content objects of this group together, meaning that digital content objects (e.g., online advertisements, etc.) belonging to the same set (e.g., an advertiser, etc.) may have equal proportion of impressions. Of course, digital content, such as online advertisements, may be partitioned into sets based at least in part on a wide variety of factors, and claimed subject matter is not limited in scope to the specific examples provided herein.

In an embodiment, individual digital content objects belonging to a particular digital content set may be assigned a weighting parameter specified for the particular content set. In an embodiment, weight values may be assigned to digital content sets, such as sets of online advertisements, prior to initiation of exploration operations, although claimed subject matter is not limited in scope in this respect. For example, it may be advantageous to weight online advertisements belonging to a particular advertiser differently than other online advertisements from other advertisers. In an embodiment, individual advertisers may pay different rates for online advertising, and/or individual advertisers may purchase different amounts of online advertising opportunities, for example. In an embodiment, it may be advantageous to more heavily weight online advertisements belonging to an advertiser with a history of purchasing greater amounts of online advertising opportunities than other advertisers, for example, although claimed subject matter is not limited in scope in this respect. In an embodiment, weighting parameters, such as for individual digital content objects and/or for digital content sets, may be adjusted in some manner, such as after initial indexing, for example, and further exploration operation(s) may be performed at least in part to re-index one or more digital content objects, such as one or more online advertisements, for example.

In an embodiment, for an example digital content-set weighted pseudo-random exploration operation, individual digital content objects, such as individual online advertisements, may be assigned a list of parameters V_d, wherein a first k parameters of list V_d may be assigned and/or comprise, for example, substantially uniformly pseudo-random values between 0 and 1, such as described previously. Also, in an embodiment, a final parameter of list V_d may be assigned and/or comprise, for example, a value of 1. Additionally, in an embodiment, a particular list of parameters V_ds may be assigned to digital content objects across a digital content set. In an embodiment, a list of parameters V_ds may be assigned and/or comprise, for example, a first k parameters comprising substantially uniformly pseudo-random values between 0 and 1, and may also be assigned and/or comprise a final parameter comprising a value of 1, for example, similar to explained above for example list of parameters V_d. In an embodiment, individual digital content objects of a digital content set, such as individual online advertisements of a set of online advertisements, may be assigned a parameter list V_d and/or a parameter list V_ds, for example, wherein parameter lists V_d are individually generated for and/or assigned to individual digital content objects and wherein V_ds is generated for and/or assigned to all digital content objects of a particular digital content set. Of course, claimed subject matter is not limited in scope to the specific examples described herein.

Also, in an embodiment, individual queries may be assigned a list of parameters V_q, wherein a first k parameters of list V_q may comprise pseudo-random binary values, and a final parameter of list V_q may comprise a pseudo-random value between 0 and 1, for example, such as explained previously. Also, in an embodiment, a list of parameters V_qs may be derived for a query in a manner similar to that discussed above in connection with example parameter list V_q, for example. In an embodiment, a query may be assigned parameter list V_q or parameter list V_qs or a combination thereof. It may be noted that for example digital content-set weighted pseudo-random exploration examples described herein, vectors (e.g., parameter lists) for individual queries may be pseudo-randomly generated, in contrast to being based at least in part on user characteristics, for example.

In an embodiment, for an example digital content-set weighted pseudo-random exploration operation, a digital content object, such as an online advertisement, a score parameter may, for example, be calculated at least in part according to an example relation:

$$1000 * \exp((\log s(V\_qs, V\_ds))/w) + s(V\_q, V\_d) \quad (6)$$

wherein s(V_qs, V_ds) denotes an inner product of V_qs and V_ds mod 1 and wherein s(V_q, V_d) denotes an inner product of parameter list V_q and parameter list V_d mod 1, for example. Additionally, "w" denotes a weight value assigned to a particular digital content set, in an embodiment. In an embodiment, score parameters assigned to individual digital content objects such as individual online advertisements may be analyzed to select one or more content objects to be displayed to one or more users as part of an example digital content-set weighted pseudo-random exploration operation, for example. Also, in an embodiment, score parameters related to digital content-set weighted pseudo-random exploration operations may be based, at least in part, on a weighting factor that may be assigned to a particular content set, and/or may be based, at least in part, on one or more characteristics of individual content objects, for example. Also, as described above, vectors V_d and/or V_q, comprising one or more pseudo-randomly generated parameter values, for example, may introduce an element of randomness into score calculation, such as in accordance with relation (6), for example.

Figure 4:
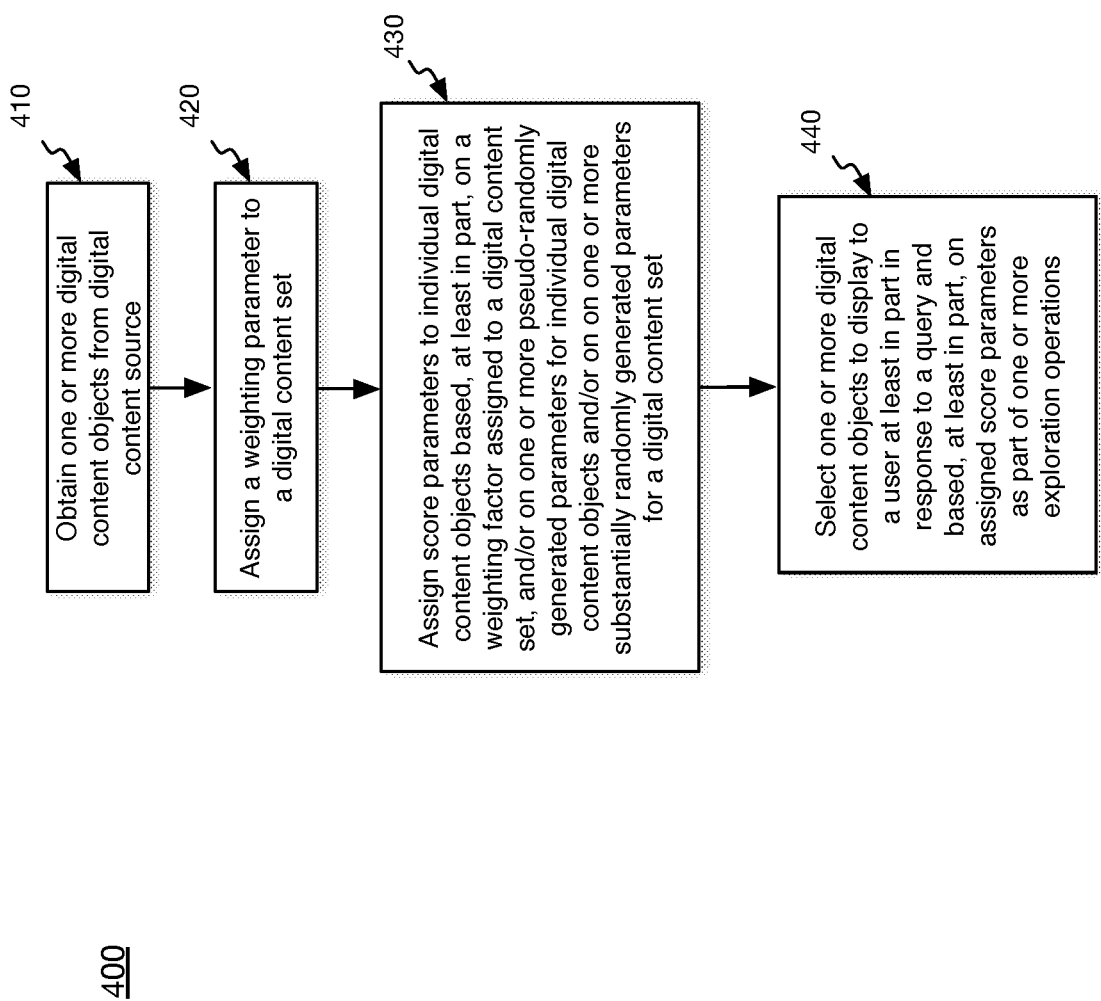
FIG. 4 is a flow diagram illustrating an embodiment of an example process for digital content-set weighted pseudo-random digital content selection, in accordance with an embodiment.

FIG. 4 is a flow diagram illustrating an embodiment 400 of an example process for an example digital content-set weighted pseudo-random exploration operation. Claimed subject matter may include all of blocks 410-440, fewer than blocks 410-440, or more than blocks 410-440. Additionally, the order of blocks 410-440 is merely an example order, and claimed subject matter is not limited in scope in these respects. As depicted at block 410, digital content, such as one or more online advertisements, may be obtained from one or more digital content sources, such as one or more online digital content sources 110. In an embodiment, individual weighting parameters may be assigned to individual digital content sets, such as sets of online advertisements, as depicted at block 420. In an embodiment, individual weighting factors to be assigned individual digital content sets may be selected based, at least in part, on a desired likelihood of selection during exploration operations for digital content objects belonging to a particular digital content set. For example, a higher weighting parameter value for a particular set of online advertisements may result in a greater likelihood that individual online advertisements within the particular online advertisement set will be selected to be displayed to a user during exploration operations, in an embodiment. Conversely, a lower weighting parameter value for a particular set of online advertisements may result in a reduced likelihood that individual online advertisements within the particular online advertisement set will be selected to be displayed to a user during exploration operations, for example.

As further depicted at block 430, a score parameter may be assigned to individual digital content objects, such as individual online advertisements. In an embodiment, a score parameter for an individual digital content object, such as an individual online advertisement, may be based, at least in part, on a weighting factor assigned to a particular digital content set. Also, in an embodiment, a score parameter for an individual digital content object, such as an individual online advertisement, may be based, at least in part, on pseudo-randomly selected parameter values of a vector (e.g., list of parameters) for a particular digital content object, such as a particular online advertisement, and/or on one or more pseudo-randomly selected parameter values of a vector (e.g., list of parameters) for a particular digital content set, such as a particular online advertisement set. In an embodiment, individual scores for individual content objects of a digital content set, such as individual online advertisements of a set of online advertisements, may be calculated, at least in part, based on relation (5) provided above. Additionally, in an embodiment, one or more online advertisements may be selected for display to a user, such as during one or more exploration operations, at least in part in response to a query, as depicted at block 440. Further, one or more online advertisements may be selected based, at least in part, on individually assigned score parameters as described above, in an embodiment, as also depicted at block 440.

In an embodiment, it may be useful, at times, to re-rank search queries and/or search query results, such as by introducing amounts of pseudo-random error into score parameter values related to one or more example exploration operations, such as one or more examples described above, although claimed subject matter is not limited in scope in this respect. In an embodiment, by introducing amounts of pseudo-random error, a greater diversity of users may, for example, be exposed to individual digital content objects, such as individual online advertisements, for example. In an embodiment, an initial ranking of score parameters for one or more digital content objects, such as one or more online advertisements, for example, for one or more individual queries, such as one or more search queries, may be represented according to a relation sr(q,d). Thus, in an embodiment, a score (e.g., for re-ranking, etc.) introducing an element of randomness to score parameters sr(q,d) may, for example, be computed according to a relation:

$$sr(q,d)+r*s(V\_q,V\_d) \qquad (7)$$

wherein V_q and V_d are as described above and wherein s(V_q, V_d) denotes an inner product of parameter list V_q and parameter list V_d mod 1, as described above, for example. In an embodiment, in some instances, example expression (7) may result in an addition of a pseudo-random number between 0 and a randomness value "r" to score parameters sr(q,d), for example. Also, in an embodiment, an amount of error and/or randomness may be introduced to query results during online digital content serving operations, in addition to and/or separately from exploration operations. For example, an amount of error and/or randomness may be introduced to score parameters for online digital content, such as online advertisements, not during exploration and/or indexing operations but instead during digital content delivery operations (e.g., after indexing is completed for digital content at issue), for example, to provide a greater diversity of query results, such as a greater diversity of online advertisements, for example. Of course, claimed subject matter is not limited in scope in these respects.

In an embodiment, an example process for executing computer instructions on at least one computing device without further human interaction in which the at least one computing device includes at least one processor and at least one memory may include fetching computer instructions from the at least one memory of the at least one computing device for execution on the at least one processor of the at least one computing device. In an embodiment, an example process may further include executing the fetched computer instructions on the at least one processor of the at least one computing device, and storing in the at least one memory of the at least one computing device any results of having executed the fetched computer instructions on the at least one processor of the at least one computing device, wherein the computer instructions to be executed comprise instructions for weighted pseudo-random digital content selection, wherein the executing the fetched weighted pseudo-random digital content selection instructions further includes a process including performing one or more exploration operations on one or more digital content objects at least in part by calculating a score parameter based, at least in part, on one or more vectors comprising one or more pseudo-randomly generated parameters and assigned to the one or more digital content objects, and on one or more weighted parameters characterizing, at least in part, the one or more digital content objects. Of course, claimed subject matter is not limited in scope to the example embodiments described herein.

Figure 5:
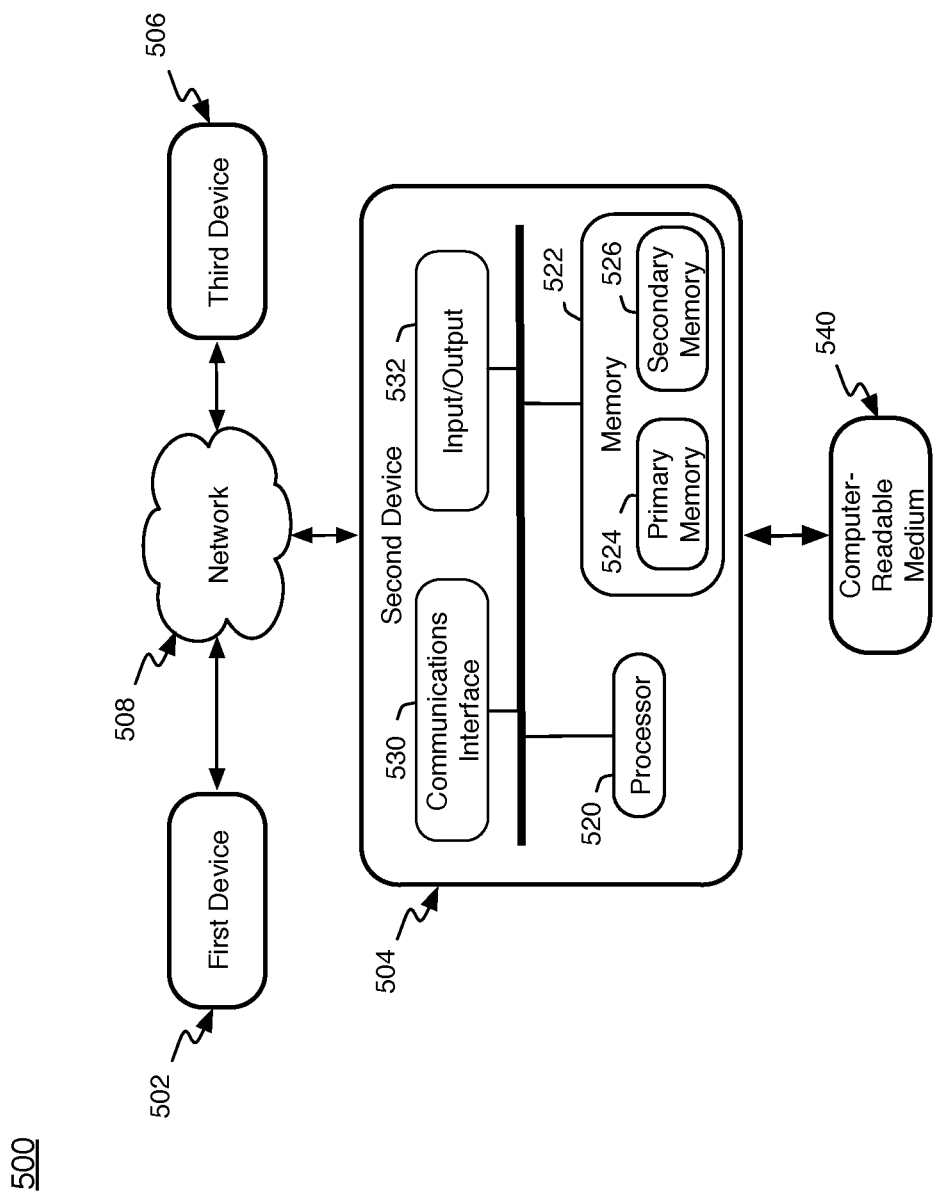
FIG. 5 is a schematic diagram illustrating an example computing device in accordance with an embodiment.

For purposes of illustration, FIG. 5 is an illustration of an embodiment 500 of a system that may be employed in indexing, exploration, and/or digital content serving operations, such as described infra. in connection with online advertising, for example. In FIG. 5, computing device 502 ('first device' in FIG. 5), which may comprise features of a client computing device, content source computing device, online advertisement server computing device, and/or server computing device, for example, may interface with computing device 504 ('second device' in FIG. 5), which may comprise features of a client computing device, content source computing device, online advertisement server computing device, and/or server computing device, for example. Communications interface 530, processor (e.g., processing unit) 520, and memory 522, which may comprise primary memory 524 and secondary memory 526, may communicate by way of a communication bus, for example. In FIG. 5, computing device 502 may represent one or more sources of analog, uncompressed digital, lossless compressed digital, and/or lossy compressed digital formats for content of various types, such as electronic documents, video, imaging, text, audio, etc. in the form physical states and/or signals, for example. Computing device 502 may communicate with computing device 504 by way of a connection, such as an internet connection, via network 508, for example. Although computing device 504 of FIG. 5 shows the above-identified components, claimed subject matter is not limited to computing devices having only these components as other implementations may include alternative arrangements that may comprise additional components or fewer components, such as components that function differently while achieving similar results. Rather, examples are provided merely as illustrations. It is not intended that claimed subject matter be limited in scope to illustrative examples.

Processor 520 may be representative of one or more circuits, such as digital circuits, to perform at least a portion of a computing procedure and/or process. By way of example, but not limitation, processor 520 may comprise one or more processors, such as controllers, microprocessors, microcontrollers, application specific integrated circuits, digital signal processors, programmable logic devices, field programmable gate arrays, and/or the like, and/or any combination thereof. In implementations, processor 520 may perform signal processing to manipulate signals and/or states, to construct signals and/or states, etc., for example.

Memory 522 may be representative of any storage mechanism. Memory 520 may comprise, for example, primary memory 522 and secondary memory 526, additional memory circuits, mechanisms, or combinations thereof may be used. Memory 520 may comprise, for example, random access memory, read only memory, etc., such as in the form of one or more storage devices and/or systems, such as, for example, a disk drive, an optical disc drive, a tape drive, a solid-state memory drive, etc., just to name a few examples. Memory 520 may be utilized to store a program. Memory 520 may also comprise a memory controller for accessing computer readable-medium 540 that may carry and/or make accessible content, which may include code, and/or instructions, for example, executable by processor 520 and/or some other unit, such as a controller and/or processor, capable of executing instructions, for example.

Under direction of processor 520, memory, such as memory cells storing physical states, representing, for example, a program, may be executed by processor 520 and generated signals may be communicated via the Internet, for example. Processor 520 may also communicate digitally-encoded signals with respect to client computing device 502.

Network 508 may comprise one or more network communication links, processes, services, applications and/or resources to support exchanging communication signals between a computing device, such as 502, and computing device 506 ('third device' in FIG. 5), which may, for example, comprise one or more client computing devices, content source computing devices, and/or server computing devices. By way of example, but not limitation, network 508 may comprise wireless and/or wired communication links, telephone and/or telecommunications systems, Wi-Fi networks, Wi-MAX networks, the Internet, a local area network (LAN), a wide area network (WAN), or any combinations thereof.

The term "computing device," as used herein, refers to a system and/or a device, such as a computing apparatus, that includes a capability to process (e.g., perform computations) and/or store content, such as electronic documents, measurements, text, images, video, audio, etc. in the form of signals and/or states. Thus, a computing device, in this context, may comprise hardware, software, firmware, or any combination thereof (other than software per se). Computing device 504, as depicted in FIG. 5, is merely one example, and claimed subject matter is not limited in scope to this particular example. For one or more embodiments, a computing device may comprise any of a wide range of digital electronic devices, including, but not limited to, personal desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, or any combination of the above. Further, unless specifically stated otherwise, a process as described herein, with reference to flow diagrams and/or otherwise, may also be executed and/or affected, in whole or in part, by a computing device.

Memory 522 may store cookies relating to one or more users and may also comprise a computer-readable medium that may carry and/or make accessible content, including code and/or instructions, for example, executable by processor 520 and/or some other unit, such as a controller and/or processor, capable of executing instructions, for example. A user may make use of an input device, such as a computer mouse, stylus, track ball, keyboard, and/or any other similar device capable of receiving user actions and/or motions as input signals. Likewise, a user may make use of an output device, such as a display, a printer, etc., and/or any other device capable of providing signals and/or generating stimuli for a user, such as visual stimuli, audio stimuli and/or other similar stimuli.

Regarding aspects related to a communications and/or computing network, a wireless network may couple client devices with a network. A wireless network may employ stand-alone ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including Long Term Evolution (LTE), WLAN, Wireless Router (WR) mesh, 2nd, 3rd, or 4th generation (2G, 3G, or 4G) cellular technology and/or the like. Network access technologies may enable wide area coverage for devices, such as client devices with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra wideband (UWB), 802.11b/g/n, and/or the like. A wireless network may include virtually any type of now known and/or to be developed wireless communication mechanism by which signals may be communicated between devices, between networks, within a network, and/or the like.

Communications between a computing device and/or a network device and a wireless network may be in accordance with known and/or to be developed communication network protocols including, for example, global system for mobile communications (GSM), enhanced data rate for GSM evolution (EDGE), 802.11b/g/n, and/or worldwide interoperability for microwave access (WiMAX). A computing device and/or a networking device may also have a subscriber identity module (SIM) card, which, for example, may comprise a detachable or embedded smart card that is able to store subscription content of a user, and/or is also able to store a contact list of the user. A user may own the computing device and/or networking device or may otherwise be a user, such as a primary user, for example. A computing device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a communication network may be embodied as a wired network, wireless network, or any combinations thereof.

A device, such as a computing and/or networking device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

A computing and/or network device may include and/or may execute a variety of now known and/or to be developed operating systems, derivatives and/or versions thereof, including personal computer operating systems, such as a Windows, iOS, Linux, a mobile operating system, such as iOS, Android, Windows Mobile, and/or the like. A computing device and/or network device may include and/or may execute a variety of possible applications, such as a client software application enabling communication with other devices, such as communicating one or more messages, such as via protocols suitable for transmission of email, short message service (SMS), and/or multimedia message service (MMS), including via a network, such as a social network including, but not limited to, Facebook, LinkedIn, Twitter, Flickr, and/or Google+, to provide only a few examples. A computing and/or network device may also include and/or execute a software application to communicate content, such as, for example, textual content, multimedia content, and/or the like. A computing and/or network device may also include and/or execute a software application to perform a variety of possible tasks, such as browsing, searching, playing various forms of content, including locally stored and/or streamed video, and/or games such as, but not limited to, fantasy sports leagues. The foregoing is provided merely to illustrate that claimed subject matter is intended to include a wide range of possible features and/or capabilities.

A network may also be extended to another device communicating as part of another network, such as via a virtual private network (VPN). To support a VPN, broadcast domain signal transmissions may be forwarded to the VPN device via another network. For example, a software tunnel may be created between a logical broadcast domain, and a VPN device. Tunneled traffic may, or may not be encrypted, and a tunneling protocol may be substantially compliant with and/or substantially compatible with any now known and/or to be developed versions of any of the following protocols: IPSec, Transport Layer Security, Datagram Transport Layer Security, Microsoft Point-to-Point Encryption, Microsoft's Secure Socket Tunneling Protocol, Multipath Virtual Private Network, Secure Shell VPN, another existing protocol, and/or another protocol that may be developed.

A network may communicate via signal packets and/or frames, such as in a network of participating digital communications. A broadcast domain may be substantially compliant and/or substantially compatible with, but is not limited to, now known and/or to be developed versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A broadcast domain may employ, for example, TCP/IP, UDP, DECnet, NetBEUI, IPX, Appletalk, other, and/or the like. Versions of the Internet Protocol (IP) may include IPv4, IPv6, other, and/or the like.

Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involves physical manipulation of physical quantities. Typically, although not necessarily, such quantities may take the form of electrical and/or magnetic signals and/or states capable of being stored, transferred, combined, compared, processed or otherwise manipulated as electronic signals and/or states representing various forms of content, such as signal measurements, text, images, video, audio, etc. It has proven convenient at times, principally for reasons of common usage, to refer to such physical signals and/or physical states as bits, values, elements, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically represented as physical electronic and/or magnetic quantities within memories, registers, and/or other storage devices, transmission devices, and/or display devices of the special purpose computer and/or similar special purpose computing and/or network device. In the context of this particular patent application, as mentioned, the term "specific apparatus" may include a general purpose computing and/or network device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation and/or a physical change and/or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

The invention claimed is:

1. A computer-implemented method, comprising:
assigning, by one or more processors, without user intervention and to each of a plurality of digital content objects, a corresponding set of one or more pseudo-randomly generated parameter values, each parameter value of the corresponding set of one or more pseudo-randomly generated parameter values corresponding to a parameter representing a feature of the plurality of digital content objects;
assigning, by the one or more processors, without user intervention and to each digital content object of the plurality of digital content objects, a weight parameter value indicating a likelihood of selecting the corresponding digital content object to provide to at least one client device for display as part of an exploration operation;
performing, by the one or more processors and without user intervention, the exploration operation to determine how to better at least one of tailor or rank online digital content, wherein the exploration operation comprises displaying one or more digital content objects to users via one or more client computing devices, tracking user interactions with respect to the one or more digital content objects and assigning score parameter values associated with the user interactions to at least some online digital content such that a plurality of impressions are substantially uniformly distributed among a set of digital content objects during the exploration operation, wherein the assigning score parameter values comprises calculating a score parameter value for each digital content object of the plurality of digital content objects based, at least in part, on:
  the corresponding set of one or more pseudo-randomly generated parameter values;
  additional one or more pseudo-randomly generated parameter values assigned to a query generated in response to online activity; and
  the weight parameter value for the corresponding digital content object;
selecting, by the one or more processors, without user intervention and for display via a client device, at least one digital content object of the plurality of digital content objects based, at least in part, on one or more score parameter values determined based, at least in part, on the exploration operation performed to determine how to better at least one of tailor or rank online digital content; and
providing, by the one or more processors and without user intervention, the at least one digital content object for display by the client device, wherein at least one of the plurality of digital content objects or the set of digital content objects is stored in a distributed computing system employing a distributed process performed over a network of computing devices, wherein computational processing of at least one of the plurality of digital content objects or the set of digital content objects utilizing the distributed computing system is associated with efficiency in computational processing associated with at least one of selecting the at least one digital content object or providing the at least one digital content object for display.

2. The computer-implemented method of claim 1, the online activity detected in relation to the client device.

3. The computer-implemented method of claim 1, the additional one or more pseudo-randomly generated parameter values not pertaining to user characteristics.

4. The computer-implemented method of claim 1, wherein the additional one or more pseudo-randomly generated parameter values characterizing one or more users.

5. The computer-implemented method of claim 1, further comprising:
  indexing each of the plurality of digital content objects based, at least in part, on the one or more score parameter values.

6. An apparatus comprising:
at least one processor and at least one memory, at least one of the at least one processor or the at least one memory being configured to:
  assign, without user intervention and to each of a plurality of digital content objects, a corresponding set of one or more pseudo-randomly generated parameter values, each parameter value of the corresponding set of one or more pseudo-randomly generated parameter values corresponding to a parameter representing a feature of the plurality of digital content objects;
  assign, without user intervention and to each digital content object of the plurality of digital content objects, a weight parameter value indicating a likelihood of selecting, by the at least one processor, the corresponding digital content object to provide to at least one client device for display as part of an exploration operation, wherein the exploration operation is performed to determine how to better at least one of tailor or rank online digital content;
  calculate, without user intervention, a score parameter value for each digital content object of the plurality of digital content objects based, at least in part, on:
    the corresponding set of one or more pseudo-randomly generated parameter values;
    additional one or more pseudo-randomly generated parameter values assigned to a query generated in response to online activity; and
    the weight parameter value for the corresponding digital content object;
  select, without user intervention, at least one digital content object of the plurality of digital content objects based, at least in part, on one or more score parameter values determined based, at least in part, on the exploration operation performed to determine how to better at least one of tailor or rank online digital content; and
  provide, without user intervention, the at least one digital content object for display by a client device, wherein at least one of the plurality of digital content objects or a set of digital content objects, among which a plurality of impressions are substantially uniformly distributed, is stored in a distributed computing system employing a distributed process performed over a network of computing devices, wherein computational processing of at least one of the plurality of digital content objects or the set of digital content objects utilizing the distributed computing system is associated with efficiency in computational processing associated with at least one of selecting the at least one digital content object or providing the at least one digital content object for display.

7. The apparatus of claim 6, the online activity detected in relation to the client device.

8. The apparatus of claim 6, the additional one or more pseudo-randomly generated parameter values not pertaining to user characteristics.

9. The apparatus of claim 6, the additional one or more pseudo-randomly generated parameter values characterizing one or more users.

10. The apparatus of claim 6, at least one of the processor or memory being configured to index each of the plurality of digital content objects based, at least in part, on the one or more score parameter values.

11. A computer program product, comprising one or more non-transitory computer readable media having computer program instructions stored therein, the computer program instructions being configured such that, when executed by one or more processors, the computer program instructions cause the one or more processors to:
  assign, by the one or more processors, without user intervention and to each of a plurality of digital content objects, a corresponding set of one or more pseudo-randomly generated parameter values, each parameter value of the corresponding set of one or more pseudo-randomly generated parameter values corresponding to a parameter representing a feature of the plurality of digital content objects;
  assign, by the one or more processors, without user intervention and to each assign, by the one or more processors, without user intervention and to each digital content object of the plurality of digital content objects, a weight parameter value indicating a likelihood of selecting the corresponding digital content object to provide to at least one client device for display as part of an exploration operation, wherein the exploration operation is performed to assign score parameter values to online digital content such that a plurality of impressions are substantially uniformly distributed among a set of digital content objects during the exploration operation, wherein the assigning score parameter values comprises calculating a score parameter value for each digital content object of the plurality of digital content objects based, at least in part, on:
the corresponding set of one or more pseudo-randomly generated parameter values;
additional one or more pseudo-randomly generated parameter values assigned to a query generated in response to online activity; and
the weight parameter value for the corresponding digital content object;
select, by the one or more processors and without user intervention, at least one digital content object of the plurality of digital content objects based, at least in part, on one or more score parameter values determined based, at least in part, on the exploration operation performed to determine how to better at least one of tailor or rank online digital content; and
provide, by the one or more processors and without user intervention, the at least one digital content object for display by a client device, wherein computational processing of at least one of the plurality of digital content objects or the set of digital content objects is associated with efficiency in computational processing associated with at least one of selecting the at least one digital content object or providing the at least one digital content object for display by employing a distributed process performed over a network of computing devices.

12. The computer program product of claim 11, the online activity detected in relation to the client device.

13. The computer program product of claim 11, the additional one or more pseudo-randomly generated parameter values not pertaining to user characteristics.

14. The computer program product of claim 11, the additional one or more pseudo-randomly generated parameter values characterizing one or more users.

15. The computer program product of claim 11, wherein the computer program instructions are further configured to cause the one or more processors to:
index each of the plurality of digital content objects based, at least in part, on the one or more score parameter values.

16. The computer-implemented method of claim 1, each parameter value of the corresponding set of one or more pseudo-randomly generated parameter values being a numerical value between zero and one.

17. The computer-implemented method of claim 1, wherein calculating the score parameter value for each of the plurality of digital content objects comprises:
calculating an inner product between a vector including a set of one or more pseudo-randomly generated parameter values and a vector including the additional one or more pseudo-randomly generated parameter values assigned to the query.

18. The apparatus of claim 6, wherein calculating the score parameter value for each digital content object of the plurality of digital content objects comprises:
calculating an inner product between a vector including a set of one or more pseudo-randomly generated parameter values and a vector including the additional one or more pseudo-randomly generated parameter values assigned to the query.

19. The computer-implemented method of claim 1, comprising:
detecting an interaction with the at least one digital content object.

20. The computer-implemented method of claim 19, comprising:
determining, based, at least in part, on the interaction, a category of user for which to provide the at least one digital content object.

* * * * *